(12) United States Patent
Seoane et al.

(10) Patent No.: US 11,885,687 B2
(45) Date of Patent: Jan. 30, 2024

(54) VEHICLE ELEVATED BODY TEMPERATURE IDENTIFICATION

(71) Applicant: Veoneer US LLC, Southfield, MI (US)

(72) Inventors: Richard Seoane, Goleta, CA (US); Thomas Herbert, Fenton, MI (US); Frank Judge, South Lyon, MI (US)

(73) Assignee: VEONEER US, LLC, Southfield, MI (US)

( * ) Notice: Subject to any disclaimer, the term of this patent is extended or adjusted under 35 U.S.C. 154(b) by 113 days.

(21) Appl. No.: 17/239,449

(22) Filed: Apr. 23, 2021

(65) Prior Publication Data
US 2022/0341788 A1 Oct. 27, 2022

(51) Int. Cl.
| | | |
|---|---|---|
| G06V 40/00 | (2022.01) | |
| G01J 5/00 | (2022.01) | |
| H04N 5/33 | (2023.01) | |
| G06V 10/147 | (2022.01) | |
| G06V 20/59 | (2022.01) | |
| G06V 40/10 | (2022.01) | |
| G06V 40/19 | (2022.01) | |
| G01J 5/48 | (2022.01) | |

(52) U.S. Cl.
CPC .......... *G01J 5/0025* (2013.01); *G06V 10/147* (2022.01); *G06V 20/597* (2022.01); *G06V 40/10* (2022.01); *G06V 40/19* (2022.01); *H04N 5/33* (2013.01); *G01J 5/48* (2013.01); *G01J 2005/0077* (2013.01)

(58) Field of Classification Search
CPC .... G01J 5/0025; G01J 5/48; G01J 2005/0077; G06V 10/147; G06V 20/597; G06V 40/10; G06V 40/19; G06V 40/145; G06V 20/59; H04N 5/33
See application file for complete search history.

(56) References Cited

U.S. PATENT DOCUMENTS

| | | | |
|---|---|---|---|
| 11,195,301 B1* | 12/2021 | Lev | G06V 40/171 |
| 2010/0007726 A1* | 1/2010 | Barbieri | G06V 40/193 |
| | | | 348/78 |
| 2013/0342691 A1* | 12/2013 | Lewis | H04N 7/18 |
| | | | 348/143 |
| 2018/0300589 A1* | 10/2018 | Levinshtein | G06V 10/766 |
| 2019/0279481 A1* | 9/2019 | Silberschatz | G08B 21/0208 |

(Continued)

FOREIGN PATENT DOCUMENTS

WO WO-2022151742 A1 * 7/2022 ............... A61B 5/01

*Primary Examiner* — Emily C Terrell
*Assistant Examiner* — Ahmed A Nasher

(57) ABSTRACT

A non-contact body temperature detection system of a vehicle includes: a thermography camera configured to generate an image of a user within a passenger cabin of the vehicle; a head detection module configured to determine a first area of the image including a head of the user; an eye detection module configured to determine a second area of the first area of the image including an eye of the user; a tear duct detection module configured to determine a third area of the second area of the image including a tear duct of the user; a temperature module configured to determine a body temperature of the user based on pixels of the third area of the image; and an indicator module configured to indicate whether the user has an elevated body temperature when the body temperature of the user is greater than a temperature threshold.

18 Claims, 7 Drawing Sheets

(56) References Cited

U.S. PATENT DOCUMENTS

| | | | |
|---|---|---|---|
| 2021/0302238 A1* | 9/2021 | Beall | G01J 5/0205 |
| 2021/0393139 A1* | 12/2021 | Manneschi | A61B 5/1176 |
| 2022/0067921 A1* | 3/2022 | Lev | G10L 25/51 |
| 2022/0155149 A1* | 5/2022 | Chen | G06V 20/64 |
| 2022/0270381 A1* | 8/2022 | Nakamura | G06V 20/59 |
| 2022/0346651 A1* | 11/2022 | Kimura | A61B 5/015 |

* cited by examiner

VEHICLE ELEVATED BODY TEMPERATURE IDENTIFICATION

FIELD

The present disclosure relates to in passenger cabin monitoring systems and methods for vehicles and more particularly to in passenger cabin detection of elevated passenger body temperature.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles can be used for individual use (e.g., by the same one or more persons) or for shared use by many different people. Rideshare systems allow users to request transportation from a pick-up location to a drop-off location.

Rideshare systems may include a fleet of human-operated and/or autonomous vehicles (e.g., cars, vans, buses, bicycles, motorcycles, etc.). The vehicles are used to transport users from requested pickup locations to requested drop-off locations. Between a user's pickup location and the user's drop-off location, one or more other users may be picked up and/or dropped off.

SUMMARY

In a feature, a non-contact body temperature detection system of a vehicle is described. A thermography camera is configured to generate an image of a user within a passenger cabin of the vehicle. A head detection module is configured to determine a first area of the image including a head of the user. An eye detection module is configured to determine a second area of the first area of the image including an eye of the user. A tear duct detection module is configured to determine a third area of the second area of the image including a tear duct of the user. A temperature module is configured to determine a body temperature of the user based on pixels of the third area of the image. An indicator module is configured to indicate whether the user has an elevated body temperature when the body temperature of the user is greater than a temperature threshold.

In further features, the indicator module is configured to indicate that the user does not have an elevated body temperature when the body temperature of the user is less than the temperature threshold.

In further features, the temperature module is configured to, in response to a determination that eyes of the user are obstructed, determine the body temperature of the user based on pixels of a fourth area of the image.

In further features, a threshold module is configured to: set the temperature threshold to a first predetermined temperature in response to a determination that the user is an adult; and set the temperature threshold to a second predetermined temperature in response to a determination that the user is not an adult.

In further features, the threshold module is configured to determine whether the user is an adult based on at least one dimension of at least one of first area, the second area, and the third area.

In further features, the threshold module is configured to: determine that the user is an adult when a number of pixels of the first area is greater than a predetermined value; and determine that the user is not an adult when the number of pixels is less than the predetermined value.

In further features, the threshold module is configured to determine whether the user is an adult based on a vertical location of a portion of one of the first area, the second area, and the third area.

In further features, the threshold module is configured to: determine that the user is an adult when the vertical location is higher than a predetermined location; and determine that the user is not an adult when the vertical location is less than the predetermined location.

In further features, the temperature module is configured to: determine a respective temperature for each pixel in one of the first area, the second area, and the third area; and determine the body temperature based on the temperatures of the pixels, respectively.

In further features, the temperature module is configured to set the body temperature based on an average of the temperatures of the pixels, respectively.

In further features, the temperature module is configured to determine the temperatures of the pixels, respectively, using one of an equation and a lookup table that relates grayscales of pixels to temperatures.

In further features, the thermography camera is a far infrared (IR) camera configured to generate the image with pixels in grayscale corresponding to temperature.

In a feature, a non-contact body temperature detection method for a vehicle is described. The method includes: by a thermography camera, generating an image of a user within a passenger cabin of the vehicle; determining a first area of the image including a head of the user; determining a second area of the first area of the image including an eye of the user; determining a third area of the second area of the image including a tear duct of the user; determining a body temperature of the user based on pixels of the third area of the image; and indicating whether the user has an elevated body temperature when the body temperature of the user is greater than a temperature threshold.

In further features, the indicating includes indicating that the user does not have an elevated body temperature when the body temperature of the user is less than the temperature threshold.

In further features, the method further includes, in response to a determination that eyes of the user are obstructed, determining the body temperature of the user based on pixels of a fourth area of the image.

In further features, the method further includes: setting the temperature threshold to a first predetermined temperature in response to a determination that the user is an adult; and setting the temperature threshold to a second predetermined temperature in response to a determination that the user is not an adult.

In further features, the method further includes determining whether the user is an adult based on at least one dimension of at least one of first area, the second area, and the third area.

In further features, the method further includes: determining that the user is an adult when a number of pixels of the first area is greater than a predetermined value; and determining that the user is not an adult when the number of pixels is less than the predetermined value.

In further features, the method further includes determining whether the user is an adult based on a vertical location of a portion of one of the first area, the second area, and the third area.

In further features, the method further includes: determining that the user is an adult when the vertical location is higher than a predetermined location; and determining that the user is not an adult when the vertical location is less than the predetermined location.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Shared vehicles can be used to transport many different users from place to place. The shared vehicles may include autonomous vehicles, vehicles that are driven by a human, or a combination of human driven vehicles and autonomous vehicles. Some human driven vehicles may have semiautonomous features.

As an example of a rideshare scenario, a user may request to be picked up at a pickup location and dropped off at a drop-off location, such as via a mobile device (e.g., a cellular phone). A ride share server may determine which of the shared vehicles should be used to transport the user from the pickup location to the drop-off location. Once a share vehicle is designated to transport the user, the shared vehicle may pick up the user at the pickup location and transport the user to the drop-off location. The shared vehicle may pick up one or more other users and/or drop off one or more other users before, during, and after transporting the user.

If one or more users of a shared vehicle are sick, however, the sickness may be spread to other users via the shared vehicle. Cleaning, sanitization, and/or disinfection of the shared vehicle after carrying a sick user may minimize a risk of spreading the sickness via the shared vehicle.

The present application involves detecting elevated body temperature of a user of a vehicle that may be indicative of the user having a sickness, such as a cold, the flu, a coronavirus, etc. An elevated body temperature (EBT) module detects the presence of an elevated body temperature of a user using one or more images of the user captured within a passenger cabin of the vehicle using a camera. Using images provides a non-contact way of body temperature detection.

The EBT module determines a body temperature of the user based on a temperature of a tear duct of the user determined using the image(s) and determines whether the user has an elevated body temperature based on a comparison of the temperature of the tear duct with a temperature threshold. If the tear duct is obstructed (e.g., by glasses) the EBT module determines the body temperature of the user based on a temperature of another portion of the face of the user (e.g., corner of mouth, forehead, etc.) If a user has an elevated body temperature, one or more remedial actions may be taken. For example, the vehicle can be cleaned before any more users are picked up for transportation.

Figure 1:
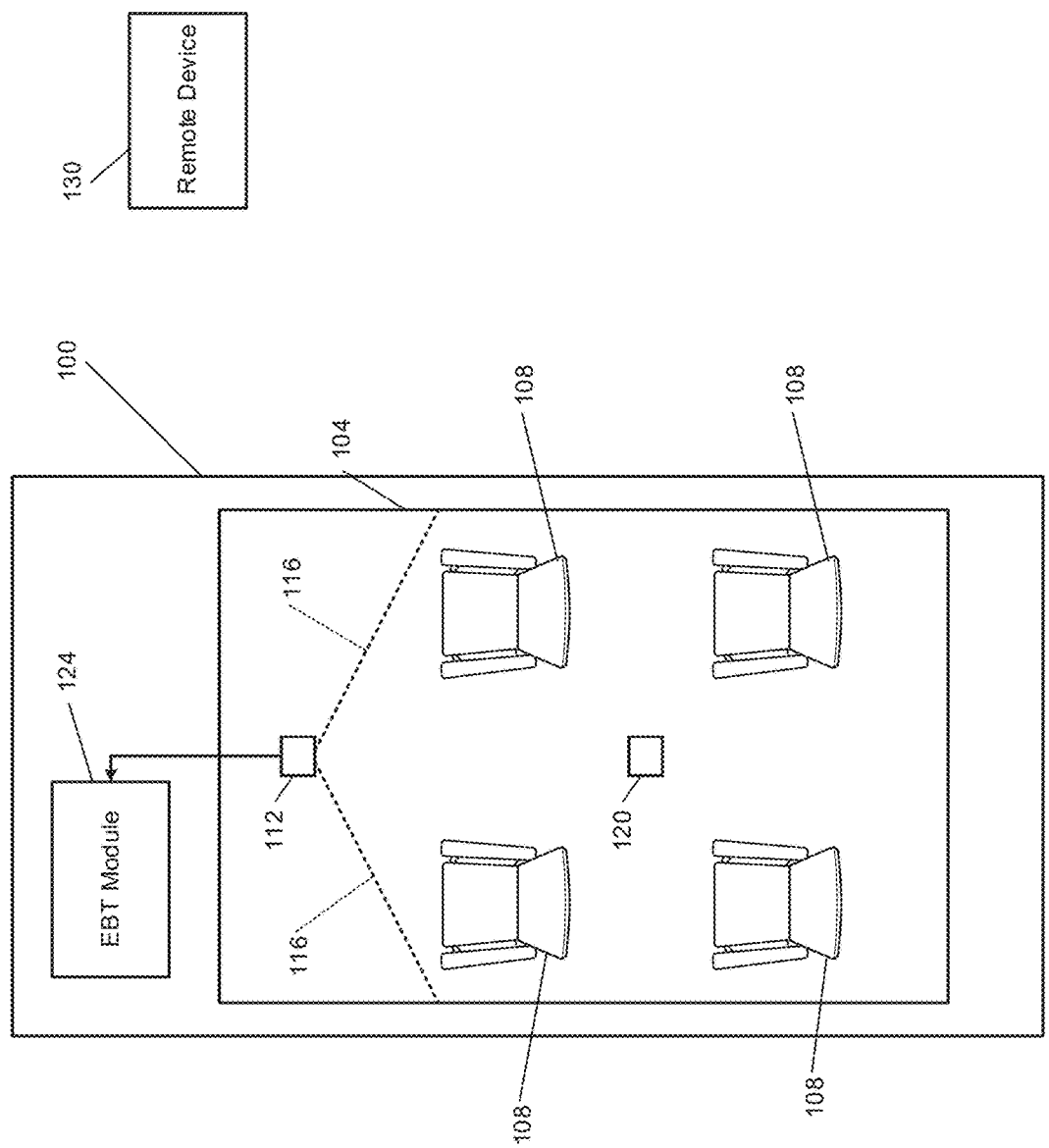
FIGS. 1-3 are functional block diagrams of example systems of a vehicle.

FIG. 1 is a functional block diagram of an example system of a vehicle 100. The vehicle 100 includes a passenger cabin 104. The vehicle 100 also includes one or more propulsion devices, such as one or more electric motors and/or an engine. The vehicle 100 may include a transmission and/or other types of gearing devices configured to transfer torque to one or more wheels of the vehicle 100 from the engine and/or the electric motor(s).

One or more seats 108 are located within the passenger cabin 104. Users of the vehicle 100 may sit on the seats 108. While the example of the vehicle 100 including four seats is provided, the present application is also applicable to greater and lesser numbers of seats. The vehicle 100 may be a sedan, a van, a truck, a coupe, a utility vehicle, boat, airplane, or another suitable type of land, air, or water based vehicle. The present application is also applicable to the vehicle 100 being a public transportation vehicle, such as a bus, a train, tram, street car, or another suitable form of public transportation.

A driver may actuate an accelerator pedal to control acceleration of the vehicle 100. The driver may actuate a brake pedal to control application of brakes of the vehicle 100. The driver may actuate a steering wheel to control steering of the vehicle 100. In various implementations, the vehicle 100 may be an autonomous vehicle or a semi-autonomous vehicle. In autonomous vehicles and semi-autonomous vehicles, acceleration, braking, and steering may be selectively controlled by one or more control modules of the vehicle 100.

Figure 2:
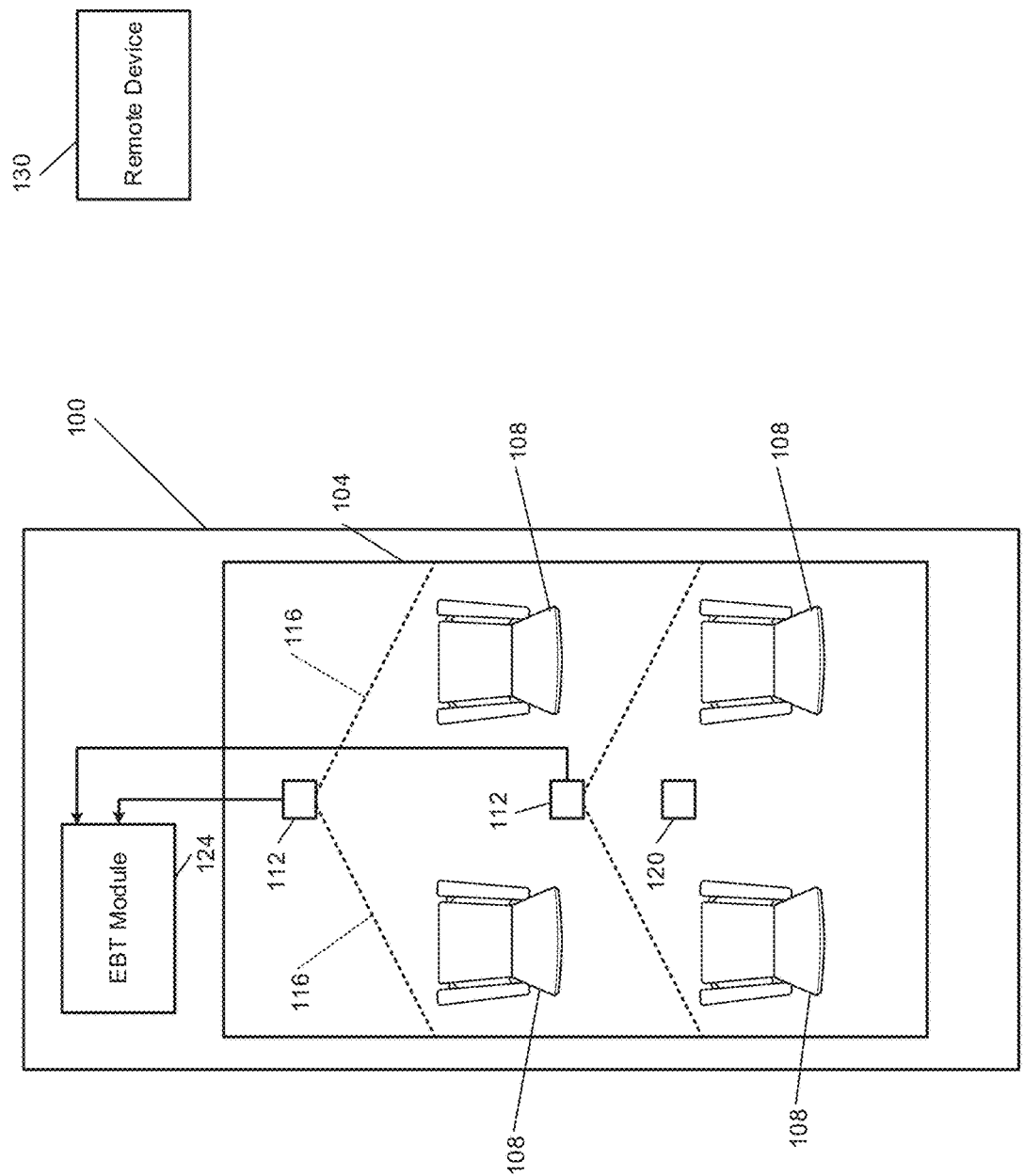
Figure 3:
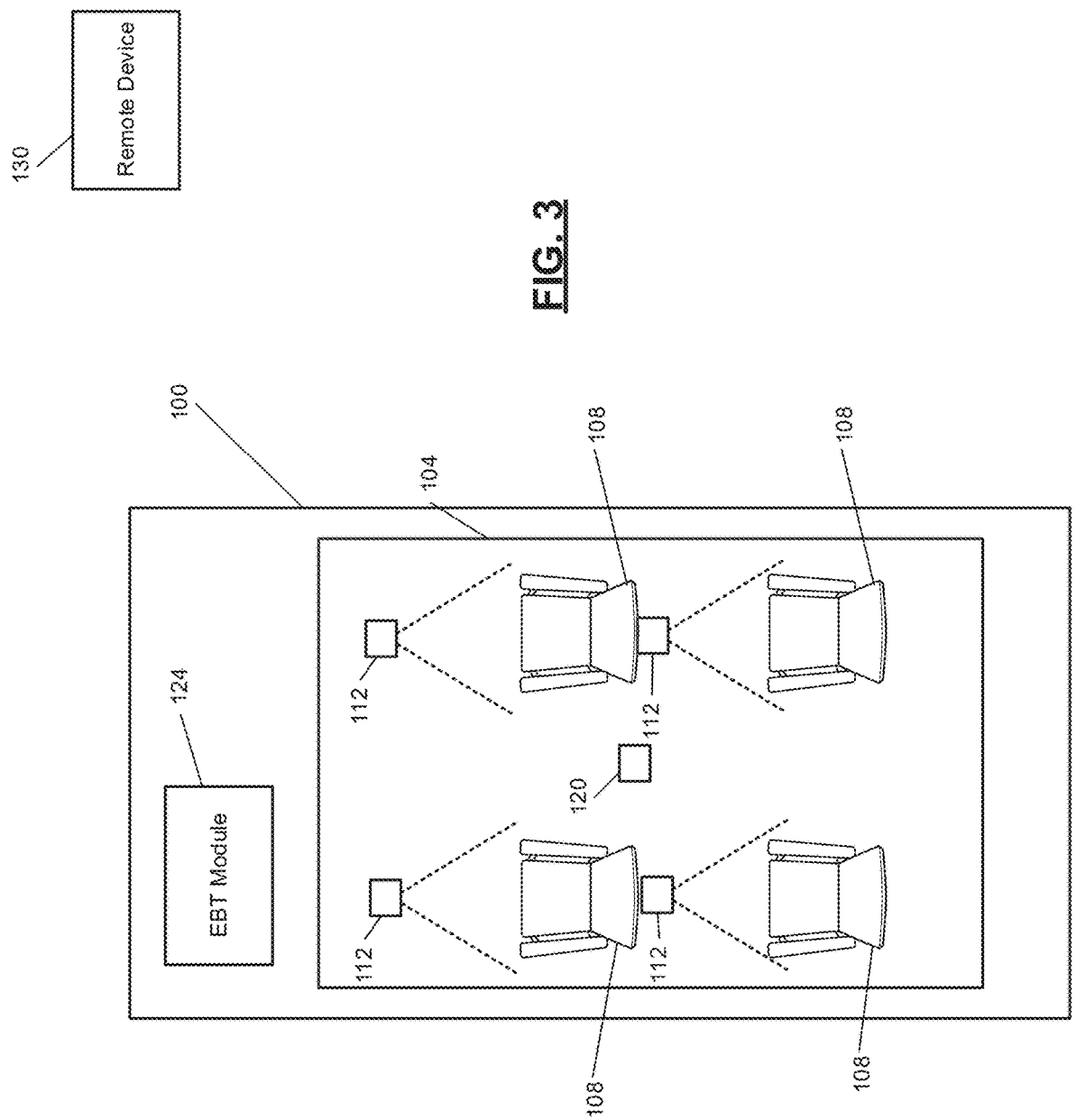

A camera 112 is disposed to capture images including eyes of users (occupants) of the vehicle 100, such as users seated on the seats. The camera 112 may be, for example, a far infrared (IR) camera or another suitable type of thermography camera. The camera 112 has a predetermined field of view (FOV). An example FOV is illustrated by 116 in FIG. 1. One or more of the seats 108 are located within the predetermined FOV of the camera 112. While the example of one camera is provided, one camera may capture images of users in front seats of the vehicle and one camera may capture images of users in rear seats of the vehicle 100, such as shown in the example of FIG. 2. Alternatively, one camera may be provided per seat to capture images of users in that seat, such as shown in the example of FIG. 3. In various implementations one or more other cameras may be included, for example, to detect and locate users, heads, faces, eyes, etc. While the example of passengers sitting in seats is provided, the present application is also applicable to passengers that are standing and in other orientations in vehicles.

In various implementations, a sanitizer sprayer 120 may be implemented within the passenger cabin 104. The sanitizer sprayer 120 may spray a sanitizer (e.g., an aerosol or liquid disinfectant) into the passenger cabin 104 and onto the seats and other surfaces to disinfect the passenger cabin 104. As an example, the sanitizer sprayer 120 may be located on a roof of the passenger cabin 104 or in another location. In various implementations, more than one sanitizer sprayer 120 may be implemented, or the sanitizer sprayer 120 may be omitted.

An elevated body temperature (EBT) module 124 determines a body temperature of a user in a seat based on one or more images from the camera 112. For example, the EBT module 124 may detect a head of the user based on an image from the camera. In a region or area of the image corresponding to the head, the EBT module 124 may detect one or more eyes of the user. In one or more regions or areas of the images including eyes, the EBT module 124 may detect one or more tear ducts of the user, respectively. The EBT module 124 may determine the body temperature of the user based on the temperature(s) of the tear duct(s) of the user.

If the body temperature of a user is greater than a temperature threshold, the EBT module 124 may take one or more remedial actions. For example, the EBT module 124 may trigger the sanitizer sprayer 120 to spray the sanitizer within the passenger cabin 104, such as for a predetermined period. Additionally or alternatively, the EBT module 124 may transmit an indicator to a remote device 130 (such as a server of a fleet manager) to clean the vehicle 100. In response to the indicator, the vehicle 100 may be disinfected (e.g., at a cleaning depot or by a driver of the vehicle 100) before any more users are picked up by the vehicle 100. In the example of the vehicle 100 being autonomous, the remote device 130 may control the vehicle 100 to drop off any remaining users within the vehicle 100 then drive the vehicle 100 to a predetermined location (e.g., of the cleaning depot) for cleaning.

Figure 4:
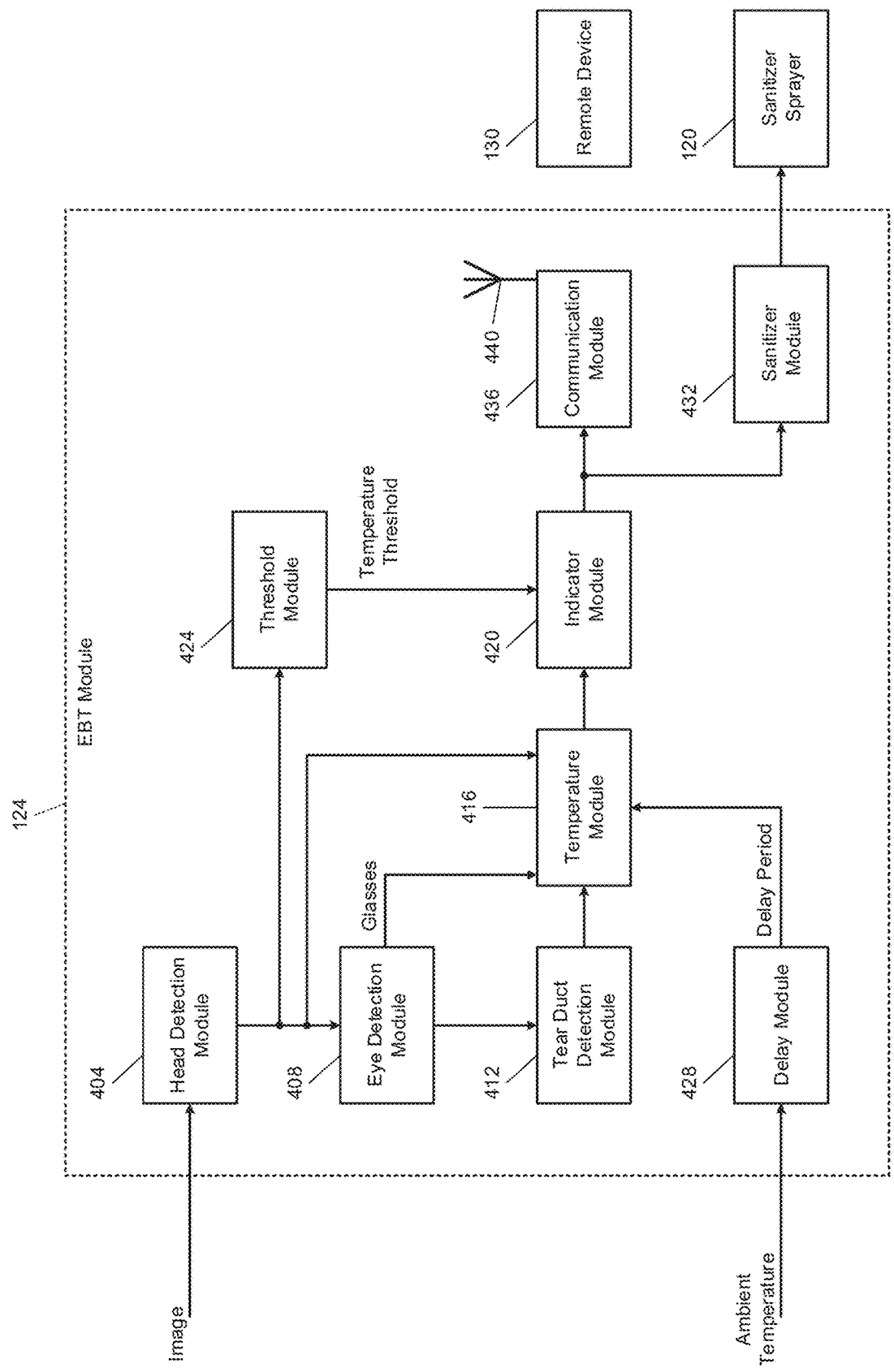
FIG. 4 is a functional block diagram of an example implementation of an elevated body temperature (EBT) module.
Figure 5:
FIG. 5 includes an example grayscale image captured using a far IR camera.

FIG. 4 is a functional block diagram of an example implementation of the EBT module 124. A head detection module 404 receives the images from the camera 112. As stated above, the camera 112 may be a far IR camera. The images received by the head detection module 404 may be in grayscale with whiter pixels indicating increased (higher) temperature and blacker pixels indicating decreased (lower) temperature. Generally speaking, a pixel may be more white (e.g., increase in intensity) as the temperature of an item in that pixel increases and vice versa. The camera 112 may capture images at a predetermined rate, such as 60 Hertz or at another suitable frequency. The camera 112 may capture images continuously or when a user is picked up by the vehicle 100. Images taken after a user is picked up may be used for EBT detection. FIG. 5 includes an example grayscale image captured using a far IR camera.

Figure 6:
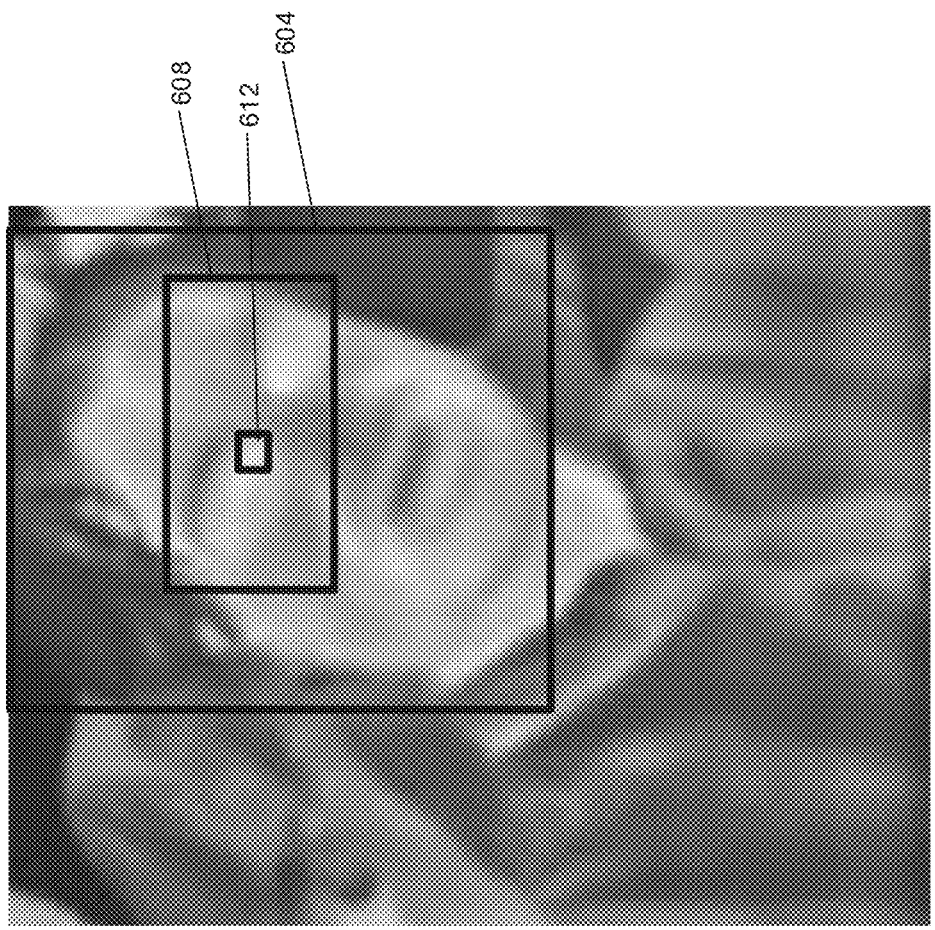
FIG. 6 includes an example grayscale image illustrating different regions of interest.

The head detection module 404 detects a head of the user in the image using a head detection algorithm. The head detection module 404 may detect the head, for example, using a Haar cascade, a convolutional neural network (CNN), or in another suitable manner. More specifically, the head detection module 404 determines a region of interest (ROI) or area including the head of the user in the image. The ROI including the head may be a rectangle of pixels including the head. An example ROI including a head is illustrated by 604 in FIG. 6.

The head detection module 404 transmits the ROI of the image including the head to an eye detection module 408. The eye detection module 408 detects one or more eyes of the user in the ROI including the head. More specifically, the eye detection module 408 determines an ROI including one or more eyes of the user in the ROI including the head. The ROI including the eye(s) may be a rectangle of pixels including the eye(s) of the user. An example ROI including eyes is illustrated by 608 in FIG. 6. The eye detection module 408 may detect the eye(s) using an eye detection algorithm. For example, the eye detection module 408 may detect the eye(s) of the user using feature extraction and constraints (e.g., nose is located below eyes, mouth is located below nose and eyes, etc.).

The head detection module 404 transmits the ROI of including the eye(s) to a tear duct detection module 412. The tear duct detection module 412 detects the tear duct(s) of the eye(s) of the user in the ROI including the eye(s). More specifically, the tear duct detection module 412 determines an ROI including tear duct(s) of the user in the ROI including the eye(s). The ROI including the tear duct(s) may be a rectangle of pixels of a predetermined size (e.g., 6 pixels×6 pixels) including the tear duct(s) of the user. While the example of a 6 pixel×6 pixel area is provided, the present application is also applicable to other predetermined sizes. The tear duct detection module 412 may set the ROI including a tear duct as the pixels of the predetermined size that are the hottest (e.g., the brightest white). An example ROI including a tear duct is illustrated by 612 in FIG. 6.

A temperature module 416 determines a body temperature of the user based on the pixels of the ROI including the tear duct(s). For example, the temperature module 416 may determine a temperature of each pixel in the ROI including the tear duct. The temperature module 416 may determine the temperature of a pixel, for example, using a lookup table or an equation that relates grayscale of a pixel to a temperature. The temperature module 416 may set the body temperature, for example, based on or equal to an average of the temperatures of the pixels of the ROI including the tear duct. Averaging may include summing the pixel temperatures and dividing by the total number of pixels in the ROI.

In various implementations, the user may wear glasses (prescription and/or sunglasses) that prevent measurement of the temperature of the tear duct. The eye detection module 408 may determine and indicate when the user is wearing glasses. For example, the eye detection module 408 may indicate that the user is wearing glasses when the ROI including the eyes includes darker (blacker) pixels. FIG. 5 illustrates examples of users wearing glasses where darker pixels over the eyes of users can be seen.

If the user is wearing glasses, the temperature module 416 may determine the body temperature based on an ROI of pixels of the predetermined size (e.g., 6 pixels×6 pixels) that are the brightest white in the ROI including the eyes or in the ROI including the head. These may be, for example, pixels at the corners of the mouth of the user or pixels on a forehead of the user. For example, the temperature module 416 may determine a temperature of each pixel in the ROI of the predetermined size. The temperature module 416 may determine the temperature of a pixel, for example, using a lookup table or an equation that relates grayscale of a pixel to a temperature. The temperature module 416 may set the body temperature, for example, based on or equal to an average of the temperatures of the pixels of the ROI. Averaging may include summing the pixel temperatures and dividing by the total number of pixels in the ROI.

An indicator module 420 indicates whether the user has an EBT (elevated body temperature) based on a comparison of the body temperature and a temperature threshold. The indicator module 420 may indicate that the user has an EBT when the body temperature is greater than the temperature threshold. The indicator module 420 may indicate that the user does not have an EBT when the body temperature is less than or equal to the body temperature.

The temperature threshold may be a fixed predetermined value. In various implementations, the temperature threshold may be a variable. For example, a threshold module 424 may set the temperature threshold to a first predetermined value when the user is an adult and set the temperature threshold to a second predetermined value when the user is a child. The second predetermined temperature may be greater than the first predetermined temperature as children may typically have body temperatures that are greater than adults.

The threshold module 424 may determine whether the user is an adult or a child (or not an adult), for example, based on a number of pixels (e.g., length, width, or total number) of the ROI of including the head. The threshold module 424 may determine the total number of pixels of the ROI including the head, for example, by multiplying lengths of two sides (e.g., length×width) of the ROI in the example of the ROI being a rectangle. The threshold module 424 may determine that the user is an adult when the number of pixels is greater than a predetermined number of pixels. The threshold module 424 may determine that the user is a child when the number of pixels is less than or equal to the predetermined number of pixels.

Additionally or alternatively, the threshold module 424 may determine whether the user is an adult or a child (or non-adult), for example, based on a vertical location of the ROI (e.g., a top edge) including the head in the image. For adults, the vertical location of the ROI including the head may be vertically higher for adults than the vertical location of the ROI including the head for children. For example, the threshold module 424 may determine that the user is an adult when the vertical location of a portion (e.g., a top edge) of the ROI including the head is higher (vertically) than a predetermined location (e.g., vertical pixel position). The threshold module 424 may determine that the user is a child when the vertical location of the portion of the ROI including the head is lower (vertically) than the predetermined location.

In various implementations, determination of whether the user has an EBT or not may be delayed by a delay period after the user enters the vehicle. Users may naturally have EBTs, for example, when ambient temperatures are high and/or users are in direct sunlight. A delay module 428 may determine the delay period based on an ambient temperature outside of the vehicle 100. The ambient temperature may be measured using a temperature sensor of the vehicle 100. Alternatively, the ambient temperature may be received from a remote data source, such as a weather provider, for example, based on a location of the vehicle 100 when the user is picked up.

In the example of delaying, the temperature module 416 may determine the body temperature using one or more images captured after the delay period passed after the user was picked up by the vehicle 100. This may prevent false indications of a user having an EBT, for example, in hot ambient air conditions and/or if the user was in the sun prior to being picked up by the vehicle 100.

One or more remedial actions may be taken when the user has an EBT. For example, a sanitizer module 432 may actuate the sanitizer sprayer 120 to spray the sanitizer within the vehicle 100 once the vehicle is empty (e.g., does not include any occupants/users) when a user has an EBT. Additionally or alternatively, a communication module 436 may wirelessly communicate an indicator that a user had an EBT via one or more antennas 440 to the remote device 130. The communication module 436 may communicate, for example, using cellular communication, WiFi communication, satellite communication, or in another suitable manner. In response to receipt of the indicator, the remote device 130 may prompt a driver of the vehicle 100 to sanitize the vehicle 100 or to drive the vehicle 100 to a predetermined location for sanitization. In the example of an autonomous vehicle, the remote device 130 may drive the vehicle 100 to the predetermined location for sanitization.

Figure 7:
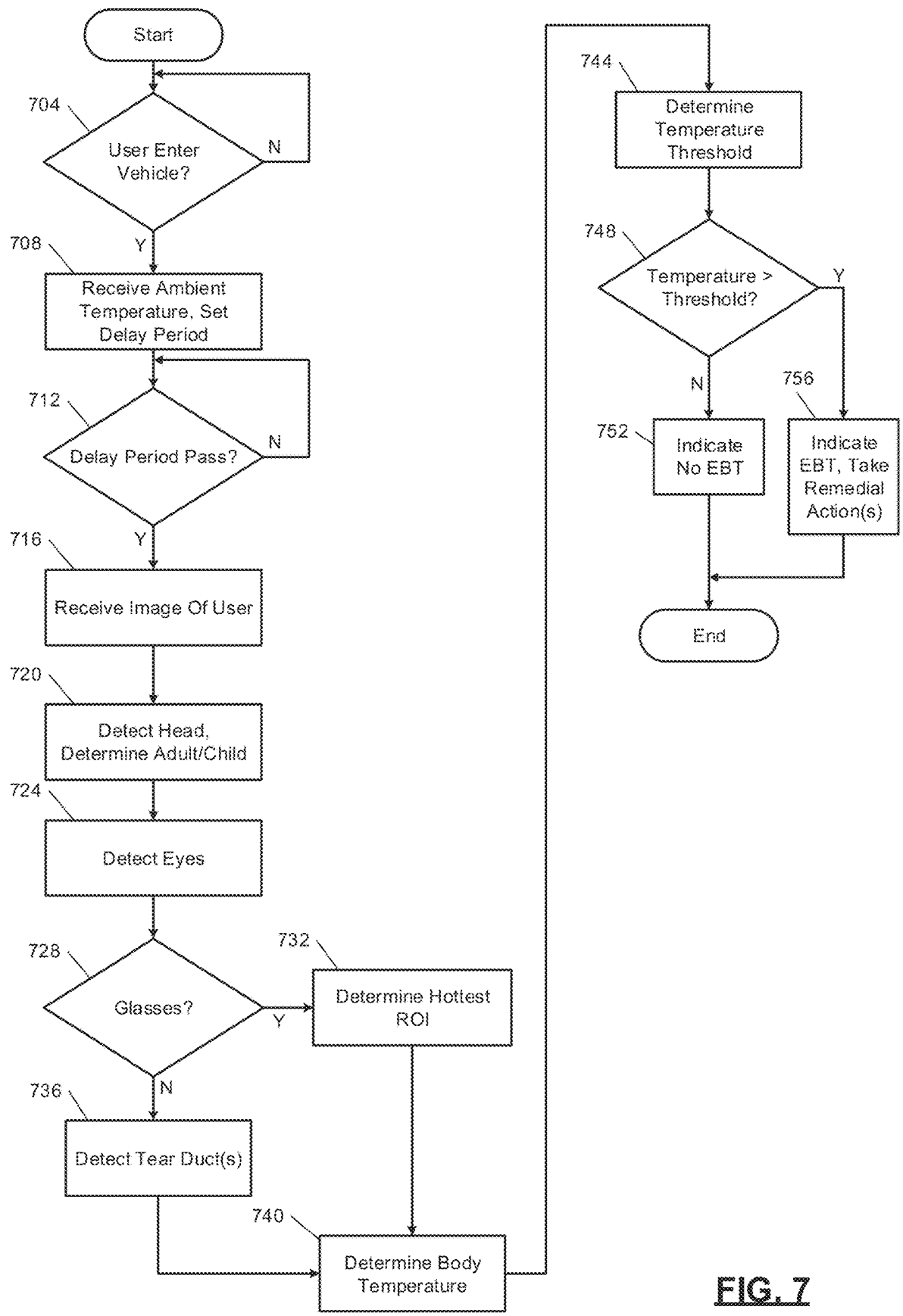
FIG. 7 is a flowchart depicting an example method of detecting EBT of a user in a vehicle.

FIG. 7 is a flowchart depicting an example method of detecting EBT of a user in a vehicle. Control begins with 704 where the head detection module 404 determines whether a user has entered the vehicle 100. For example, the head detection module 404 may determine that a user has entered the vehicle 100 when a first image captured using the camera 112 at a first time does not include a user and a second image captured using the camera 112 at a second time that is after the first time includes a user. As another example, the head detection module 404 may determine that a user has entered the vehicle 100 when a seat sensor measuring mass on a seat of the vehicle 100 transitioned from less than a predetermined mass to greater than the predetermined mass. While examples are provided, the present application is also applicable to determining whether a user has entered the vehicle 100 in other ways. If 704 is true, control continues with 708. If 704 is false, control may remain at 704.

At 708, the delay module 428 may receive the ambient temperature outside of the vehicle 100 and determine the delay period. The delay module 428 may determine the delay period, for example, using a lookup table or an equation that relates ambient temperatures to delay periods. As an example, the delay period may increase as the ambient temperature increases and vice versa. The delay module 428 may also reset a timer (e.g., to zero) and start incrementing the timer at 708.

At 712, the temperature module 416 may determine whether the delay period has passed. For example, the temperature module 416 may determine whether the timer is greater than or equal to the delay period. If 712 is true, control may continue with 716. If 712 is false, control may remain at 712. In various implementations, 708 and 712 may be omitted.

At 716, the head detection module 404 receives an image including the user captured using the camera 112. At 720, the head detection module 404 detects a head of the user, such as described above. The head detection module 404 outputs an ROI including the head. The threshold module 424 may also determine whether the user is an adult or a child at 720, such as based on the number of pixels (e.g., length, width, or total number) of the ROI including the head. Input from one or more other cameras may be used to assist or support detection and locate users, sizes, glasses, etc. Examples of other cameras include visible infrared cameras, near IR cameras, and other types of cameras.

At 724, the eye detection module 408 detects one or more eyes of the user as described above. The eye detection module 408 outputs an ROI including the eye(s). At 728, the eye detection module 408 determines and indicates whether the user is wearing glasses over his or her eyes. If 728 is false, control may continue with 736. If 728 is true, the temperature module may determine an ROI of a predetermined size (e.g., 6 pixels×6 pixels) having the hottest temperature in the ROI including the eyes or in the ROI including the head at 732. Control continues with 740.

At 736, the tear duct detection module 412 detects one or more tear ducts of one or more eyes of the user as described above. The tear duct detection module 412 outputs an ROI of the predetermined size (e.g., 6 pixels×6 pixels) including the tear duct(s). Control continues with 740.

At 740, the temperature module 416 determines a body temperature of the user based on the pixels of the predetermined size (e.g., of the tear ducts or having the hottest temperature). For example, the temperature module 416 may determine a temperature for each pixel and average the temperatures of the pixels of the predetermined size to determine the body temperature. At 744, the threshold module 424 determines the temperature threshold. The temperature threshold may be a fixed predetermined value or determined based on whether the user is an adult or a human, as discussed above.

At 748, the indicator module 420 determines whether the temperature is greater than the temperature threshold. If 748 is false, the indicator module 420 may indicate that the user does not have an EBT at 752, and control may end. If 748 is false, the indicator module 420 may indicate that the user has an EBT at 756. One or more remedial actions may be taken, such as described above. While control is shown as ending, control may return to 704 for a next user.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A non-contact body temperature detection system of a vehicle, the system comprising:
    a thermography camera configured to generate an image of a user within a passenger cabin of the vehicle;
    a head detection module configured to determine a first area of the image including a head of the user;
    an eye detection module configured to determine a second area within the first area of the image including an eye of the user;
    a tear duct detection module configured to determine a third area within the second area of the image including a tear duct of the user;
    a temperature module configured to determine a body temperature of the user based on pixels within the third area of the image,
    wherein the temperature module is configured to:
    determine a respective temperature for each pixel in the first area, the second area, and the third area; and
    determine the body temperature based on the temperatures of the pixels, respectively;
    an indicator module configured to indicate whether the user has an elevated body temperature when the body temperature of the user is greater than a temperature threshold; and
    a threshold module configured to:
    set the temperature threshold to a first predetermined temperature in response to a determination that the user is an adult; and
    set the temperature threshold to a second predetermined temperature in response to a determination that the user is not an adult.

2. A non-contact body temperature detection system of a vehicle, the system comprising:
    a thermography camera configured to generate an image of a user within a passenger cabin of the vehicle;
    a head detection module configured to determine a first area of the image including a head of the user;
    an eye detection module configured to determine a second area within the first area of the image including an eye of the user;
    a tear duct detection module configured to determine a third area within the second area of the image including a tear duct of the user;
    a temperature module configured to determine a body temperature of the user based on (a) a sum of temperatures of the pixels, respectively, of the third area of the image divided by (b) a total number of the pixels of the third area; and
    an indicator module configured to indicate whether the user has an elevated body temperature when the body temperature of the user is greater than a temperature threshold.

3. The system of claim 2 wherein the indicator module is configured to indicate that the user does not have an elevated body temperature when the body temperature of the user is less than the temperature threshold.

4. The system of claim 2 wherein the temperature module is configured to, in response to a determination by the eye detection module that eyes of the user are obstructed, determine the body temperature of the user based on pixels of a fourth area of the image.

5. The system of claim 2 wherein the threshold module is configured to determine whether the user is an adult based on at least one dimension of at least one of first area, the second area, and the third area.

6. The system of claim 5 wherein the threshold module is configured to:
    determine that the user is an adult when a number of pixels of the first area is greater than a predetermined value; and
    determine that the user is not an adult when the number of pixels is less than the predetermined value.

7. The system of claim 2 wherein the threshold module is configured to determine whether the user is an adult based on a vertical location of a portion of one of the first area, the second area, and the third area.

8. The system of claim 7 wherein the threshold module is configured to:
    determine that the user is an adult when the vertical location is higher than a predetermined location; and
    determine that the user is not an adult when the vertical location is less than the predetermined location.

9. The system of claim 2 wherein the temperature module is configured to set the body temperature based on an average of the temperatures of the pixels, respectively.

10. The system of claim 2 wherein the temperature module is configured to determine the temperatures of the pixels, respectively, using one of an equation and a lookup table that relates grayscales of pixels to temperatures.

11. The system of claim 2 wherein the thermography camera is a far infrared (IR) camera configured to generate the image with pixels in grayscale corresponding to temperature.

12. A non-contact body temperature detection method for a vehicle, the method comprising:
    by a thermography camera, generating an image of a user within a passenger cabin of the vehicle;
    determining a first area of the image including a head of the user;
    determining a second area within the first area of the image including an eye of the user;
    determining a third area within the second area of the image including a tear duct of the user;
    determining a body temperature of the user based on pixels within the third area of the image including:
    determining a respective temperature for each pixel in the first area, the second area, and the third area; and
    determining the body temperature based on the temperatures of the pixels, respectively;

indicating whether the user has an elevated body temperature when the body temperature of the user is greater than a temperature threshold;

setting the temperature threshold to a first predetermined temperature in response to a determination that the user is an adult; and setting the temperature threshold to a second predetermined temperature in response to a determination that the user is not an adult.

13. The method of claim 12 wherein the indicating includes indicating that the user does not have an elevated body temperature when the body temperature of the user is less than the temperature threshold.

14. The method of claim 12 further comprising, in response to a determination that eyes of the user are obstructed, determining the body temperature of the user based on pixels of a fourth area of the image.

15. The method of claim 12 further comprising determining whether the user is an adult based on at least one dimension of at least one of first area, the second area, and the third area.

16. The method of claim 15 further comprising determining:

that the user is an adult when a number of pixels of the first area is greater than a predetermined value; and that the user is not an adult when the number of pixels is less than the predetermined value.

17. The method of claim 12 further comprising determining whether the user is an adult based on a vertical location of a portion of one of the first area, the second area, and the third area.

18. The method of claim 17 further comprising:

determining that the user is an adult when the vertical location is higher than a predetermined location; and determining that the user is not an adult when the vertical location is less than the predetermined location.

* * * * *